United States Patent
Akiyama et al.

(10) Patent No.: US 9,600,665 B2
(45) Date of Patent: Mar. 21, 2017

(54) MONITORING DEVICE AND MONITORING METHOD

(71) Applicant: NIPPON TELEGRAPH AND TELEPHONE CORPORATION, Chiyoda-ku (JP)

(72) Inventors: Mitsuaki Akiyama, Musashino (JP); Takeo Hariu, Suginami-ku (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 14/653,078

(22) PCT Filed: Dec. 20, 2013

(86) PCT No.: PCT/JP2013/084351
§ 371 (c)(1),
(2) Date: Jun. 17, 2015

(87) PCT Pub. No.: WO2014/098239
PCT Pub. Date: Jun. 26, 2014

(65) Prior Publication Data
US 2015/0332045 A1    Nov. 19, 2015

(30) Foreign Application Priority Data

Dec. 21, 2012    (JP) .................... 2012-279085

(51) Int. Cl.
*G06F 21/55*    (2013.01)
*G06F 21/54*    (2013.01)
(Continued)

(52) U.S. Cl.
CPC ........ *G06F 21/552* (2013.01); *G06F 11/3466* (2013.01); *G06F 21/14* (2013.01);
(Continued)

(58) Field of Classification Search
CPC ........ G06F 21/00; G06F 21/10; G06F 21/121; G06F 2221/2137; G06F 2221/2135;
(Continued)

(56) References Cited

U.S. PATENT DOCUMENTS 6,038,585 A * 3/2000 Togawa .................... G06F 8/45
                                                    718/100
6,101,329 A * 8/2000 Graef ........................ G06F 5/14
                                                    365/221

(Continued)

FOREIGN PATENT DOCUMENTS

CN    101739333 A    6/2010
JP    2004 185064    7/2004
(Continued)

OTHER PUBLICATIONS

International Search Report Issued Mar. 25, 2014 in PCT/JP2013/084351 filed Dec. 20, 2013.
(Continued)

*Primary Examiner* — Thanhnga B Truong
(74) *Attorney, Agent, or Firm* — Oblon, McClelland, Maier & Neustadt, L.L.P.

(57) ABSTRACT

A monitoring unit in a monitoring system determines whether or not a program to be executed is a program to be monitored. If it is determined that the program to be executed is a program to be monitored, the monitoring unit in the monitoring system adds, in order, before an instruction string included in a function called by the program to be monitored, an instruction string satisfying a predetermined condition, and a condition branch instruction, which is an instruction starting a predetermined control process when the predetermined condition is satisfied.

9 Claims, 6 Drawing Sheets

(51) Int. Cl.
*G06F 21/56* (2013.01)
*G06F 21/14* (2013.01)
*G06F 11/34* (2006.01)

(52) U.S. Cl.
CPC .............. *G06F 21/54* (2013.01); *G06F 21/56* (2013.01); *G06F 21/566* (2013.01); *G06F 2221/2125* (2013.01)

(58) Field of Classification Search
CPC .............. G06F 11/0748; G06F 11/0784; G06F 11/0733; G06F 11/00; G06F 13/00; G06F 11/30; G06F 15/173; G06F 15/16; G03G 15/5075; H04L 41/06; H04L 43/0817; H04L 41/0233; H04N 1/00042; H04N 1/00079; H04N 1/00344; H04N 2201/0094; H04N 2201/0039; H04N 2201/0081; H04N 2201/0082; H04N 2201/0091; H04N 2201/0093
USPC ........ 726/22–26; 380/231; 705/52; 702/182, 702/184, 188; 709/218, 224; 714/E11.025; 713/182
See application file for complete search history.

(56) References Cited

U.S. PATENT DOCUMENTS

| | | | |
|---|---|---|---|
| 6,263,488 | B1 | 7/2001 | Fortin et al. |
| 6,954,720 | B2* | 10/2005 | Oya .................. G03G 15/5075 702/182 |
| 2001/0014958 | A1 | 8/2001 | Yamauchi et al. |
| 2002/0144124 | A1* | 10/2002 | Remer .................. G06F 21/10 713/182 |
| 2002/0199172 | A1 | 12/2002 | Bunnell |
| 2005/0183072 | A1 | 8/2005 | Horning et al. |

FOREIGN PATENT DOCUMENTS

| | | |
|---|---|---|
| JP | 2009 031859 | 2/2009 |
| JP | 2011 028506 | 2/2011 |

OTHER PUBLICATIONS

Matsumoto, T. et al., "A Keylogger Detection Using Dynamic API Inspection", Transactions of Information Processing Society of Japan, vol. 48, No. 9, pp. 3141-3142, Sep. 15, 2007 (with Partial translation).
Iwamura, M. et al., "The Buffer overflow attack detection and the attack traces extraction in a binary program", IPSJ SIG Notes, vol. 2004, No. 22, p. 190, Mar. 5, 2004 (with Partial translation).
Hunt, G. et al., "Detours: Binary Interception of Win32 Functions", $3^{rd}$ USENIX Windows (registered trademark) NT Symposium, USENIX, 9 Pages, Jul. 1999.
Office Action issued Mar. 15, 2016 in Japanese Patent Application No. 2014-553231 (with English language translation).
Mitsuaki Akiyama, et al., "Scalable and Performance-Efficient Client Honeypot on High Interaction System", IEEE, Proceedings of 2012 IEEE/IPSJ $12^{th}$ International Symposium on Applications and the Internet (SAINT 2012), Jul. 16, 2012, pp. 40-50 and Cover Pages.
Takaaki Matsumoto, et al., "A Keylogger Detection Using Dynamic API Inspection", Journal of Information Processing, Information Processing Society of Japan, vol. 48, No. 9, Sep. 15, 2007, 23 Pages (reference previously filed, submitting partial English translation only).
M. Iwamura, et al., "The Buffer overflow attack detection and the attack traces extraction in a binary program", IPSJ SIG Notes, vol. 2004, No. 22, Mar. 5, 2004, 18 Pages (reference previously filed, submitting partial English translation only).
Extended European Search Repot issued Jul. 27, 2016 in Patent Application No. 13864860.5.
Office Action issued Dec. 22, 2016 in European Patent Application No. 13864860.5.
Office Action issued Dec. 2, 2016 in Chinese Patent Application No. 201380066213.8.

* cited by examiner

MONITORING DEVICE AND MONITORING METHOD

FIELD

The present invention relates to a monitoring device and a monitoring method.

BACKGROUND

Conventionally, in order to detect, on a computer system, unauthorized invasion by an attacker or operation of a malicious program, a host type invasion detecting method of detecting suspicious operations from behavior of the system has been proposed (for example, see Non-Patent Literature 1).

As a method of monitoring operations of an application on a system, a method of monitoring application programming interface (API) calls has been performed. This API is a function realizing abstraction of various system calls. For example, an application is able to perform, through an API, file input and output, communication control, and the like, in a simplified manner, without being directly conscious of hardware. By monitoring such API calls, log information on a type of the API, what kinds of arguments have been input, and the like is able to be acquired, and as a result, a series of operations of the application are able to be monitored.

Further, as a method of acquiring such log information, API hooking for causing log information to be acquired by performing transition of a control flow in the midst of an API call or of execution of the API has been used. For example, as a method of acquiring log information by API hooking, a method of inserting a jump instruction or call instruction into a head instruction of each API, causing transition of a processing flow to another instruction string, acquiring log information, and returning the processing flow to the original API has been known.

CITATION LIST

Non-Patent Literature

Non-Patent Literature 1: "Detours: Binary Interception of Win32 Functions", 3rd USENIX Windows (registered trademark) NT Symposium, USENIX, by Galen Hunt, July 1999

SUMMARY

Technical Problem

However, in the above mentioned conventional technique, since the jump instruction or call instruction is inserted into the head instruction in order to use API hooking, the malignant program may not perform the intended malicious operations, and the API calls may not be able to be monitored appropriately.

For example, in the above mentioned method of using API hooking, since transition of the processing flow to another instruction string is performed by inserting a jump instruction or call instruction into a head instruction of an API, the malignant program is able to determine whether the API is being hooked by checking the head instruction of the API. Therefore, if the malignant program determines that the API is being hooked, the malignant program may not perform the intended malignant operations and the API calls may not be able to be monitored appropriately.

Therefore, this invention has been made to solve the above described problem of the conventional technique, and aims to monitor API calls appropriately by making it impossible for a malicious program to recognize that the API calls are being monitored.

Solution to Problem

To solve the problems described above and achieve the object, a monitoring device includes a determining unit that determines whether or not a program to be executed is a program to be monitored; and an instruction adding unit that adds, in order, before an instruction string included in a function called by the program to be monitored, a first instruction string satisfying a predetermined condition, and a condition branch instruction that is an instruction starting a predetermined control process when the predetermined condition is satisfied, if the determining unit determines that the program to be executed is the program to be monitored.

Further, monitoring method includes a determining step of determining whether or not a program to be executed is a program to be monitored; and an instruction adding step of adding, in order, before an instruction string included in a function called by the program to be monitored, a first instruction string satisfying a predetermined condition, and a condition branch instruction that is an instruction starting a predetermined control process when the predetermined condition is satisfied, if it is determined by the determining step that the program to be executed is the program to be monitored.

Advantageous Effects of Invention

A monitoring device and a monitoring method disclosed in this application enable appropriate monitoring of API calls by making it impossible for a malicious program to recognize that the API calls are being monitored.

DESCRIPTION OF EMBODIMENTS

Hereinafter, preferred embodiments of a monitoring device and a monitoring method according to this invention will be described in detail with reference to the accompanying drawings. The invention is not limited by these embodiments.

[First Embodiment]

Figure 1:
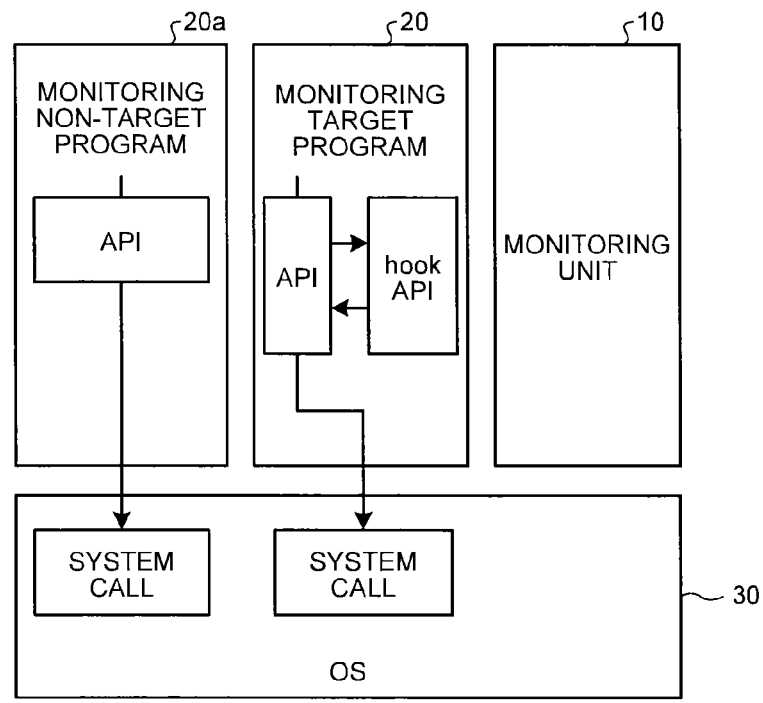
FIG. 1 is a block diagram illustrating a configuration of a monitoring system according to a first embodiment.

First, an outline of a monitoring system according to a first embodiment will be described by using FIG. 1. FIG. 1 is a block diagram illustrating a configuration of the monitoring system according to this embodiment. As illustrated in FIG. 1, the monitoring system according to this embodiment has a monitoring unit 10, a monitoring target program 20, a monitoring non-target program 20a, and an operating system (OS) 30. The configuration described herein is just an example, and the monitoring system may be implemented in various other modes.

The monitoring unit 10 is a program operated on the OS 30, and monitors accesses related to host resources and processes from the monitoring target program 20. For example, this monitoring unit 10 is implemented as a module library configured of a plurality of modules. Each monitoring unit 10 monitors operations of the monitoring target program 20 for each process (each program) or each module.

The monitoring target program 20 is a program to be monitored by the monitoring system, and operates together with the monitoring unit 10. For example, this monitoring target program 20 is a malignant program, such as a computer virus or a worm, or an untrustable program that has a possibility of having vulnerability.

In the monitoring system according to the first embodiment, a head instruction of an application programming interface (API) called by the monitoring target program 20 is replaced with a hooking instruction string added with: a condition branch instruction; and, before the condition branch instruction, an instruction string always satisfying the condition branch instruction.

Further, the monitoring non-target program 20a is a program to be not monitored by the monitoring system. The monitoring unit 10 knows in advance characteristics of a malicious program to be the monitoring target program 20, and is able to distinguish between the monitoring target program 20 and the monitoring non-target program 20a.

The OS 30 is software for operating various programs, and provide various functions called by system calls to the monitoring target program 20 or the monitoring non-target program 20a.

The monitoring unit 10 of the monitoring system according to the first embodiment inserts "hook_API" for hooking the API to be hooked, into the monitoring target program 20, if the monitoring target program 20 is determined to be executed. When this monitoring target program 20 executes the hooked API, since the monitoring target program 20 executes the system calls via a hook API, the monitoring unit 10 is able to monitor all of API execution of the monitoring target program 20.

That is, as a result of performing a process (for example, a process of acquiring log information on input values or the like of the API) of monitoring behavior of the monitoring target program 20 by the monitoring target program 20 executing the hooked API and going through the hook API, the API execution of the monitoring target program 20 is able to be monitored.

Figure 2:
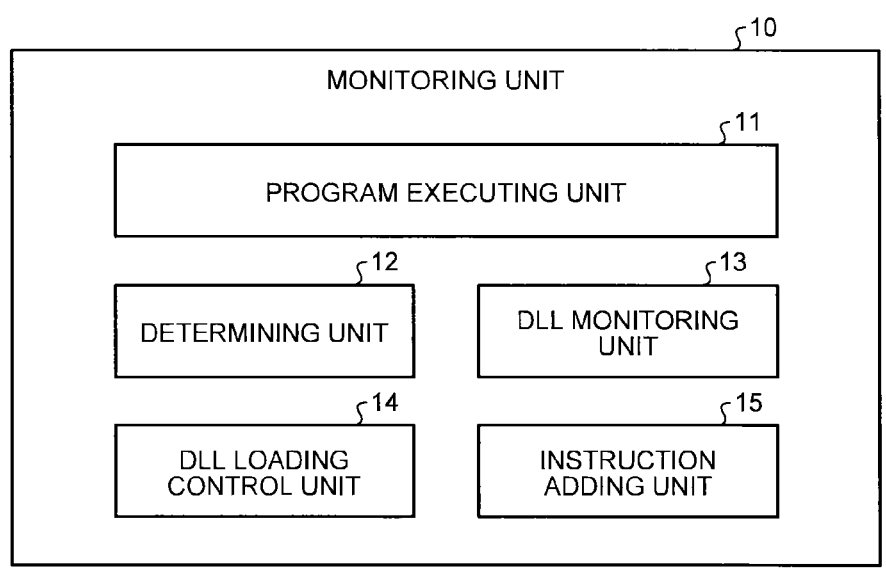
FIG. 2 is a functional block diagram illustrating a configuration of a monitoring unit.

Next, a configuration of the monitoring unit 10 will be described by using FIG. 2. FIG. 2 is a functional block diagram illustrating the configuration of the monitoring unit 10. As illustrated in FIG. 2, the monitoring unit 10 in particular has a program executing unit 11, a determining unit 12, a dynamic link library (DLL) monitoring unit 13, a DLL loading control unit 14, and an instruction adding unit 15. An outline of a function that each of these functional units has will be described first and a process performed by each of these functional units will be described in detail later.

Figure 3:
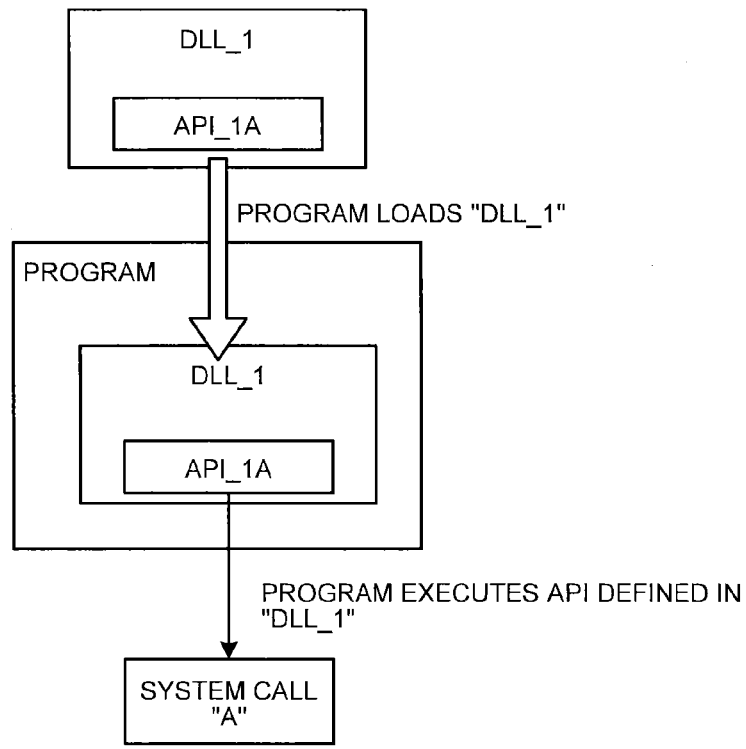
FIG. 3 is a diagram illustrating normal execution procedure of an API.

The program executing unit 11 operates the monitoring target program 20 or monitoring non-target program 20a. First, a normal process in a case where the monitoring non-target program 20a is executed will be described by using FIG. 3. FIG. 3 is a diagram illustrating normal execution procedure of an API. As exemplified in FIG. 3, when the monitoring non-target program 20a uses "API_1A", "DLL_1" implemented with "API_1A" is loaded into a memory of a process being operated by the program. The monitoring non-target program 20a then executes "API_1A" defined in "DLL_1".

Further, when the program executing unit 11 operates the monitoring target program 20, the program executing unit 11 causes the monitoring target program 20 to be executed after a code having an API for calling "hook_API" described therein has been inserted into the monitoring target program 20. Specifically, when the program executing unit 11 operates the monitoring target program 20, the code, in which the API for calling "hook_API" is described, is inserted into the monitoring target program 20, and thereafter the program executing unit 11 causes the monitoring target program 20 to be executed in a semi-transparent virtual isolated environment provided by the monitoring system.

As described, by executing the monitoring target program 20 after the code, in which the API for calling "hook_API" is described, has been inserted into the monitoring target program 20, the program executing unit 11 performs the process (the process of acquiring the log information of the input values or the like of the API, for example) of monitoring the behavior of the monitoring target program 20 and monitors the API execution of the monitoring target program 20.

The determining unit 12 determines whether or not a program to be executed is a program to be monitored. Specifically, the determining unit 12 determines whether a program executed by the program executing unit 11 is the monitoring target program 20 or monitoring non-target program 20a and notifies a result of the determination to the DLL monitoring unit 13.

The DLL monitoring unit 13 monitors whether or not a DLL implemented with the API to be hooked has been loaded. Specifically, when the DLL monitoring unit 13 receives the result of the determination that the monitoring target program 20 is executed from the determining unit 12, the DLL monitoring unit 13 monitors whether the DLL implemented with the API to be hooked has been loaded into the memory of the process operated by the monitoring target program 20. When the DLL implemented with the API to be hooked has been loaded into the memory, the DLL monitoring unit 13 notifies to the DLL loading control unit 14 that it has been loaded.

The DLL loading control unit 14 loads the hook DLL into the process memory of the target program. Specifically, the DLL loading control unit 14 causes the DLL implemented with the hook API to be loaded into the memory of the targeted process when the DLL loading control unit 14 receives, from the DLL monitoring unit 13, the notification that the DLL implemented with the API to be hooked has been loaded into the memory.

The instruction adding unit 15 adds, in order, before an instruction string included in an API called by the monitoring target program 20, an instruction string satisfying a predetermined condition and a condition branch instruction, which is an instruction that starts a predetermined control process when the predetermined condition is satisfied, when the monitoring target program 20 is executed.

Specifically, if the DLL implemented with the hook API has been loaded into the memory of the targeted process by the DLL loading control unit 14, as a DLL initialization process, the instruction adding unit 15 rewrites an instruction around a head of the API to be hooked into: an instruction string of an arithmetic operation, comparison, or the like that always satisfies a predetermined condition; and a condition branch instruction that causes transition to a control flow for executing a process (for example, a process of acquiring log information or the like) of monitoring the behavior of the monitoring target program 20 when the predetermined condition is satisfied.

For example, a plurality of pairs may be set beforehand, each of these pairs associating an instruction string always satisfying a predetermined condition and a condition branch instruction causing transition to a control flow for acquiring log information or the like when the predetermined condition is satisfied, and the instruction adding unit 15 may randomly acquire one pair from the plurality of pairs and add the condition branch instruction and instruction string associated with each other in the acquired pair into the API head instruction called by the monitoring target program 20. Further, the instruction adding unit 15 may generate an instruction string always satisfying a predetermined condition and a condition branch instruction causing transition to a control flow for acquiring log information or the like when the predetermined condition is satisfied.

Figure 4:
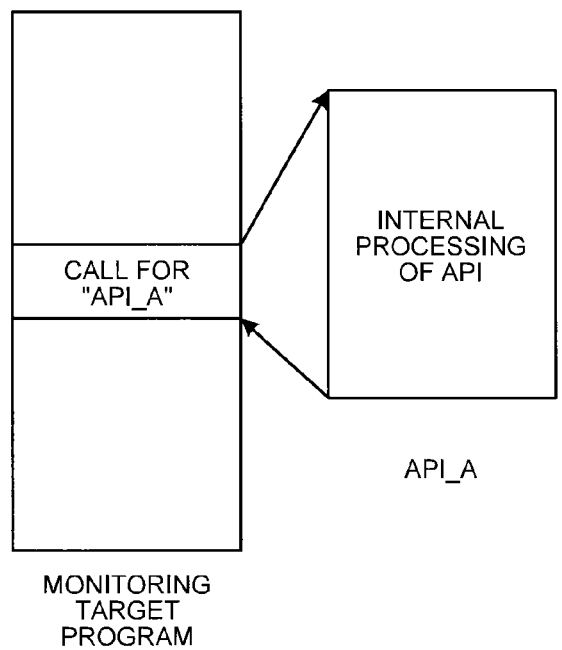
FIG. 4 is a diagram illustrating a normal API call.

A normal API call will be described by using FIG. 4. FIG. 4 is a diagram illustrating the normal API call. As exemplified in FIG. 4, if a call for an API included in a monitoring target program is performed, internal processing of the API is executed.

Figure 5:
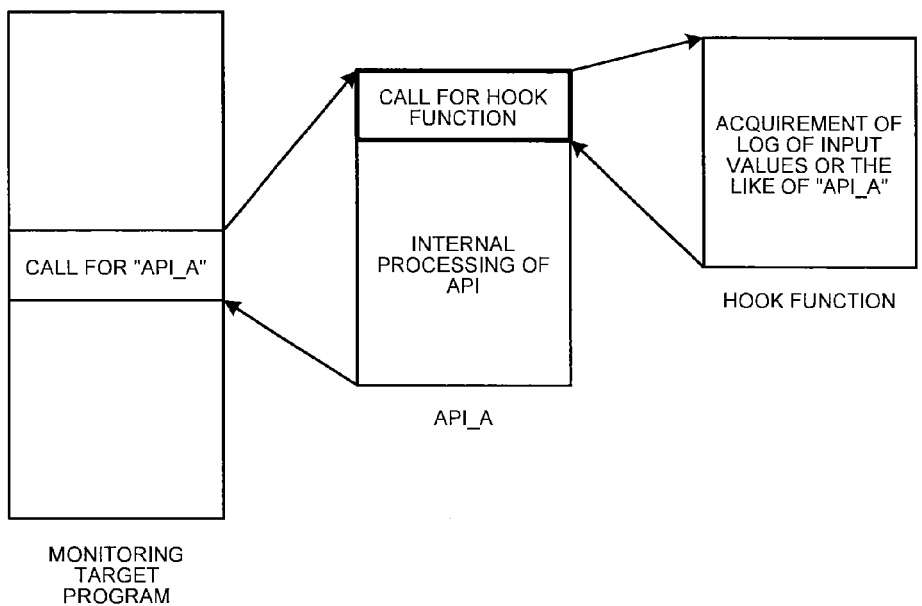
FIG. 5 is a diagram illustrating API hooking.

An API call monitoring method, by API hooking of causing transition of processing to another instruction string and performing log acquirement or the like by rewriting a head instruction of such an API, is used. For example, as illustrated in FIG. 5, by adding a call instruction for a hook function into the head instruction of the API, transition to a processing flow of acquiring a log of input values or the like of the API is caused and thereafter, the processing flow is returned to the original API.

Conventionally, as the call instruction for a hook function, the head instruction of the API has been rewritten into a jump instruction or call instruction. In contrast, the monitoring unit 10 according to this embodiment rewrites, as the call instruction for a hook function, the head instruction of the API, into the condition branch instruction and the instruction string of an arithmetic operation, comparison, or the like, which always satisfies the condition branch instruction.

For example, the condition branch instruction is an instruction determining whether to cause transition of a control flow to a specified address according to a state of a flag register. The flag register is a register in which "0" or "1" is registered as a result of an instruction, such as an arithmetic operation or comparison. Further, the above described instruction string is an instruction string, such as arithmetic operation or comparison, which satisfies the condition of the condition branch instruction. When processing of the arithmetic operation or comparison is executed by this instruction string, the state of the flag register is brought into a state always satisfying the condition of the condition branch instruction.

That is, by rewriting the head instruction of the API into the condition branch instruction and the instruction string, such as the arithmetic operation or comparison, always satisfying the condition of that condition branch instruction, an instruction string synonymous with jump instruction always causing transition of the control flow to a specified address is able to be generated. An infinite number of combinations of these condition branch instructions and instruction strings always satisfying these condition branch instructions are able to be generated, and thus an instruction string that is unpredictable by the program is able to be generated and determination of whether hooking is being performed is able to be made difficult.

That is, since, by adding the condition branch instruction and the instruction string always satisfying the condition of the condition branch instruction, instead of a jump instruction or call instruction, the transition of the control flow is able to: make the program making the API call determine that the API is not being hooked; and cause that program to execute the API, the monitoring unit 10 is able to: make the malignant program unable to recognize that the API call is being monitored; and monitor API calls appropriately.

Further, an instruction string may be dynamically generated every time an API is hooked. Therefore, the program making the API call is unable to determine whether hooking is being performed, by comparing the head of the API with the pattern of a particular instruction string. Thereby, API hooking is enabled and operations of the program are able to be monitored, without being noticed by the malignant program.

Figure 6:
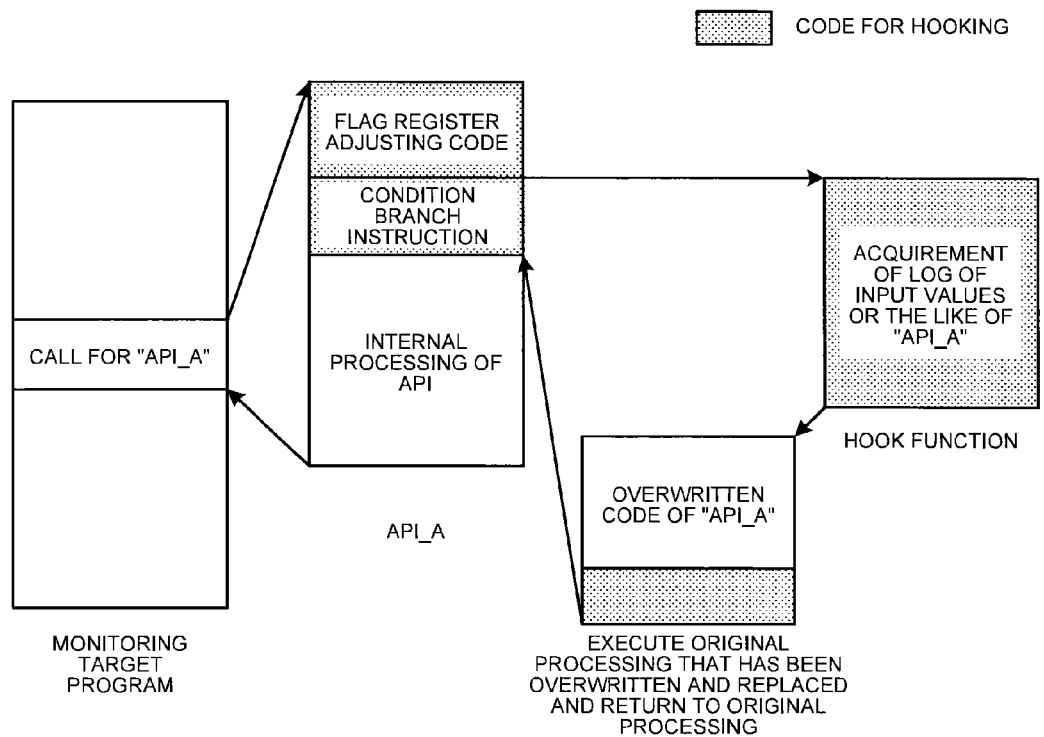
FIG. 6 is a diagram illustrating a process for a case where a head instruction of an API has been rewritten into a condition branch instruction and an instruction string always satisfying a condition of the condition branch instruction.

A case where a head instruction of an API is rewritten into a condition branch instruction and an instruction string always satisfying a condition of the condition branch instruction will be described by using an example in FIG. 6. FIG. 6 is a diagram illustrating a process for the case where the head instruction of the API has been rewritten into the condition branch instruction and the instruction string always satisfying the condition of the condition branch instruction. As exemplified in FIG. 6, a head instruction of "API_A" called by the monitoring target program 20 is rewritten into a flag register adjusting code and a condition branch instruction. The flag register adjusting code is an instruction string executing an arithmetic operation, a comparison, or the like, and is an instruction code for making adjustment such that when processing of the arithmetic operation or comparison is executed by this instruction string, the state of the flag register is brought into a state satisfying a condition of the condition branch instruction.

Further, the condition branch instruction is an instruction that causes transition of a control flow to a specified address when the state of the flag register satisfies a predetermined condition. As described above, since the flag register adjusting code added before the condition branch instruction adjusts the state of the flag register to be brought into the state satisfying the predetermined condition, transition of the control flow to the specified address is enabled. This control flow is, for example, a control flow of executing the process of acquiring the input values or the like of "API_A".

Further, since the head of the API is rewritten into the condition branch instruction and the instruction string always satisfying the condition of the condition branch instruction; before the control flow is returned to the original API and after the overwritten original processing is executed, the control flow is returned to the original API, and the original processing that has not been overwritten, that is, the internal processing of the API, is executed. Thereby, the API is able to be executed without any contradiction.

Next, execution procedure of an API will be described by using FIG. 7. When the monitoring target program 20

Figure 7:
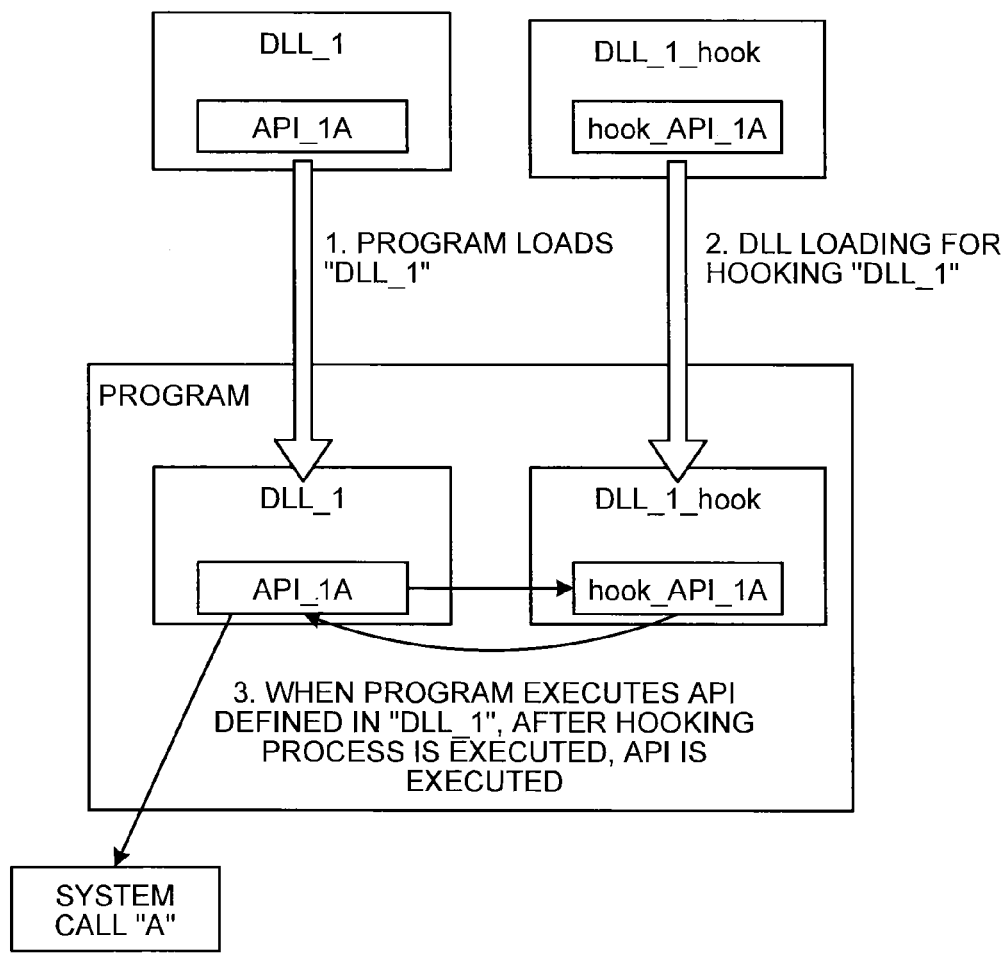
FIG. 7 is a diagram illustrating execution procedure of an API upon API hooking.

(referred to as "program" in FIG. 7) is executed, the monitoring target program 20 loads "DLL_1" implemented with "API_1A" (see "1" in FIG. 7). After "DLL_1" has been loaded, the monitoring target program 20 loads "DLL_1 hook" implemented with "hook_API_1A" for executing processing by hooking "API_1A" (see "2" in FIG. 7).

When "DLL_1 hook" has been loaded by the monitoring target program 20, the monitoring unit 10 adds, into a head instruction string of "API_1A", a condition branch instruction and an instruction string always satisfying a condition of the condition branch instruction before that condition branch instruction, such that if "API_1A" is executed, transition of the instruction to "hook_API_1A" is caused. Thereafter, when the monitoring target program 20 executes "API_1A" defined in "DLL_1", after a hooking process is executed, the API is executed (see "3" in FIG. 7).

As described above, when "API_1A" is executed upon loading of "DLL_1 hook" by the monitoring target program 20, the monitoring unit 10 adds, into the head instruction string of "API_1A", the condition branch instruction and the instruction string always satisfying that condition branch instruction, such that the transition of the instruction to "hook_API 1A" is caused. The file of "DLL_1" itself may be rewritten beforehand, but since the source code needs to be modified and compiled, the source code of the DLL implemented with the API to be hooked needs to be open to the public. Further, directly rewriting the binary itself is technically possible, but since reverse engineering of the binary becomes necessary and depending on the program, this may be prohibited, rewriting may not be possible.

[Processing by Monitoring Unit]

Figure 8:
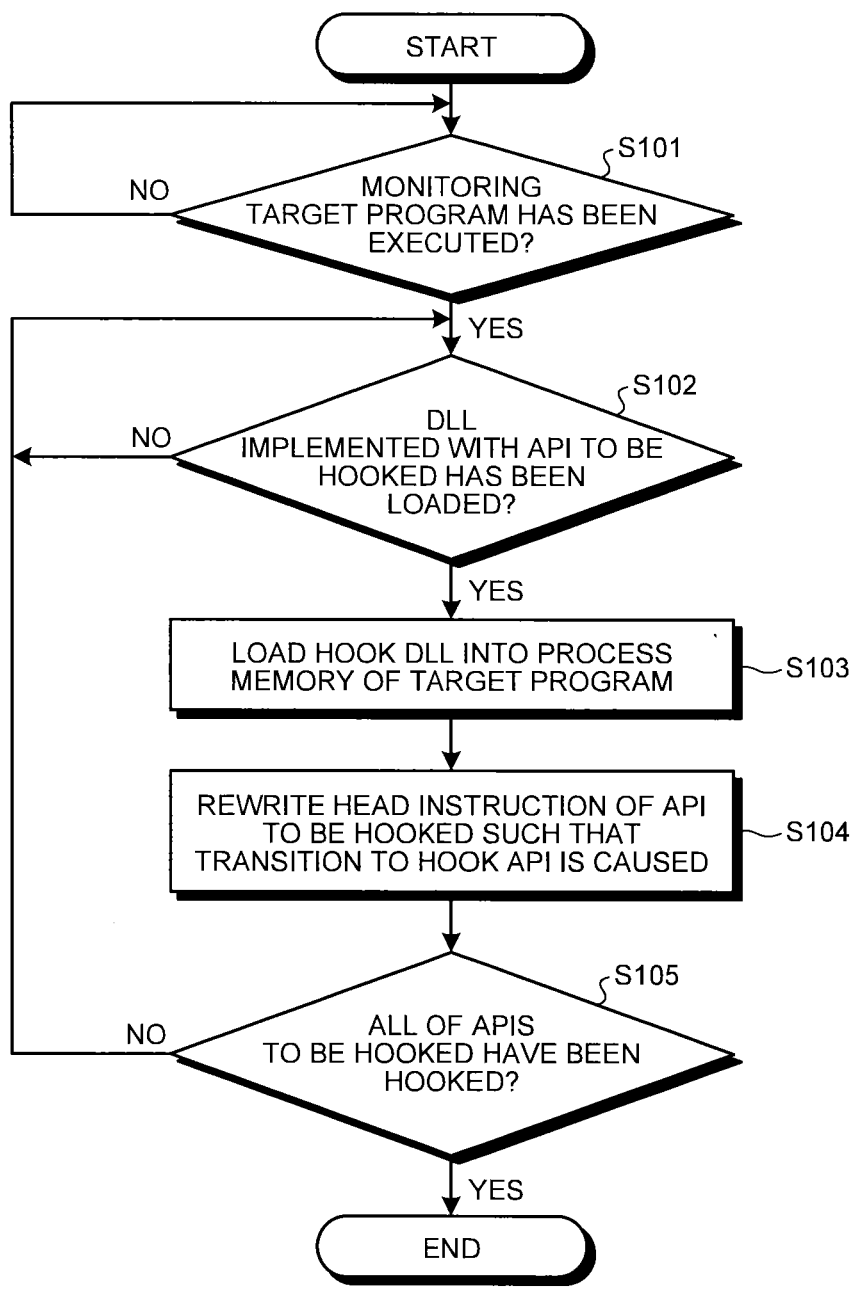
FIG. 8 is a flow chart illustrating processing operations of the monitoring unit according to the first embodiment.

Next, processing by the monitoring unit 10 according to the first embodiment will be described by using FIG. 8. FIG. 8 is a flow chart illustrating processing operations of the monitoring unit according to the first embodiment.

As illustrated in FIG. 8, the determining unit 12 of the monitoring unit 10 determines whether or not a monitoring target program has been executed (Step S101), and if it is determined that a monitoring target program has been executed (Step S101: Yes), the determining unit 12 determines whether or not a DLL implemented with an API to be hooked has been loaded (Step S102).

As a result, if the DLL monitoring unit 13 of the monitoring unit 10 determines that the DLL implemented with the API to be hooked has not been loaded (Step S102: No), the DLL monitoring unit 13 returns to the processing of Step S102. Further, if it is determined that the DLL implemented with the API to be hooked has been loaded (Step S102: Yes), the DLL loading control unit 14 of the monitoring unit 10 loads a hook DLL into a process memory of the target program (Step S103).

The instruction adding unit 15 of the monitoring unit 10 rewrites the head instruction of the API to be hooked such that transition to a hook API is caused (Step S104). Specifically, when the DLL implemented with the hook API is loaded into the memory of the targeted process by the DLL loading control unit 14, the instruction adding unit 15 rewrites, as a DLL initialization process, the instruction around the head of the API to be hooked, into a condition branch instruction and an instruction string, such as an arithmetic operation or a comparison, which always satisfies a condition of the condition branch instruction.

The monitoring unit 10 then determines whether all of the APIs to be hooked have been hooked (Step S105). That is, since the APIs to be hooked may be implemented in a plurality of DLLs, or the timing to load the DLL is not necessarily at the time of initiating the program, until all of the APIs to be hooked are able to be hooked, the monitoring target program needs to be monitored.

As a result, when the monitoring unit 10 determines that all of the APIs to be hooked have not been hooked (Step S105: No), the monitoring unit 10 returns to the processing of Step S102. Further, when the monitoring unit 10 determines that all of the APIs to be hooked have been hooked (Step S105: Yes), the monitoring unit 10 ends the processing.

[Effects of First Embodiment]

As described above, the monitoring unit 10 according to the first embodiment determines whether or not a program to be executed is a program to be monitored. If the monitoring unit 10 determines that the program to be executed is a program to be monitored, the monitoring unit 10 adds in order, before the instruction string included in the function called by the program to be monitored, an instruction string satisfying a predetermined condition, and a condition branch instruction, which is an instruction starting a predetermined control process if the predetermined condition is satisfied.

Therefore, since the monitoring unit 10 according to the first embodiment is able to generate an infinite number of patterns of the instruction strings for causing transition of the control flow and the condition branch instructions, it is difficult for the monitoring target program 20 to determine that the API has been hooked, and thus without the monitoring of the operations of the program being obstructed, the operations of the monitoring target program 20 are able to be monitored. As a result, the monitoring unit 10 is able to make it impossible for the malignant program to recognize that the API calls are being monitored and is able to monitor the API calls appropriately.

Further, the monitoring unit 10 according to the first embodiment randomly acquires one pair from a plurality of pairs, each of the pairs associating an instruction string always satisfying a predetermined condition with a condition branch instruction that causes transition to a control flow of acquiring log information or the like when the predetermined condition is satisfied, and adds the condition branch instruction and instruction string associated with each other in the acquired pair into the API head instruction called by the monitoring target program 20. Therefore, since a plurality of combinations of the instruction strings for causing transition of the control flow and the condition branch instructions are able to be generated beforehand, adding, into the head instruction of the API, an instruction string satisfying a predetermined condition and a condition branch instruction, which is an instruction starting a predetermined control process if the predetermined condition is satisfied, becomes easy. Further, since the acquirement is performed randomly, it is possible to make it difficult for the monitoring target program 20 to determine that the API is being hooked.

Further, the monitoring unit 10 according to the first embodiment adds, in order, a first instruction string executing an arithmetic operation or comparison such that a value stored in the flag register satisfies a predetermined condition, and a condition branch instruction, which is an instruction starting a predetermined control process when the flag register satisfies the predetermined condition. Therefore, by using the existing flag register, an infinite number of patterns of the instruction strings for causing transition of the control flow and the condition branch instructions are able to be generated.

Further, the monitoring unit 10 according to the first embodiment executes the API including the condition branch instruction and instruction string and performs, as a control process, a process of monitoring behavior of the monitoring target program 20. For example, by acquiring a log of input values or the like of the API, the monitoring unit 10 is able to monitor the behavior of the monitoring target program 20 and monitor operations of the monitoring target program appropriately.

Further, if system call monitoring in the kernel layer is executed, it is necessary to: trap not only the monitoring target program but also all of system call events on the OS including unrelated programs; and execute processing by determining whether these are programs to be monitored from the process IDs or the like. Therefore, in the system call monitoring in the kernel layer, overhead for processing the unrelated system call events is generated. In contrast, since the monitoring unit 10 according to the first embodiment monitors only the monitoring target program 20, the above mentioned overhead is not generated.

[Second Embodiment]

Although the embodiment of the present invention has been described, the present invention may be implemented in various different modes other than the above described embodiment. Hereinafter, other embodiments included in the present invention will be described, as a second embodiment.

(1) System Configuration and the Like

Further, each component of the respective devices is functionally and conceptionally illustrated, and is not necessarily physically configured as illustrated in the drawings. That is, specific modes of distribution and integration of the respective devices are not limited to those illustrated in the drawings, and depending on various loads and use situations, all or some of the devices may be functionally or physically distributed or integrated in arbitrary units for configuration. For example, the determining unit 12 and the instruction adding unit 15 may be integrated with each other. Further, all or any part of the processing functions executed by the respective devices may be realized by a CPU or a program analyzed and executed by the CPU, or may be implemented as hardware by wired logic.

Furthermore, of the respective processes described in the embodiment, all or some of the processes described as being performed automatically may be performed manually, or all or some of the processes described as being performed manually may be performed automatically by a known method. In addition, the procedural sequences, control sequences, specific names, and information including various data and parameters described above and illustrated in the drawings may be arbitrarily modified unless otherwise particularly stated.

(2) Program

Further, a program, which describes the above described processing executed by the monitoring unit 10 in the embodiment in a language executable by a computer, may be generated. For example, a monitoring program, which describes the processing executed by the monitoring unit 10 in a language executable by a computer, may be generated. In this case, by the computer executing the monitoring program, effects that are the same as those of the above embodiment are able to be obtained. Further, by recording that monitoring program in a computer readable recording medium and causing the computer to load the monitoring program recorded in this recording medium for execution, processing that is the same as that of the first embodiment may be realized. Hereinafter, an example of a computer that executes a monitoring program realizing functions that are the same as those of the monitoring unit 10 illustrated in FIG. 2 will be described.

Figure 9:
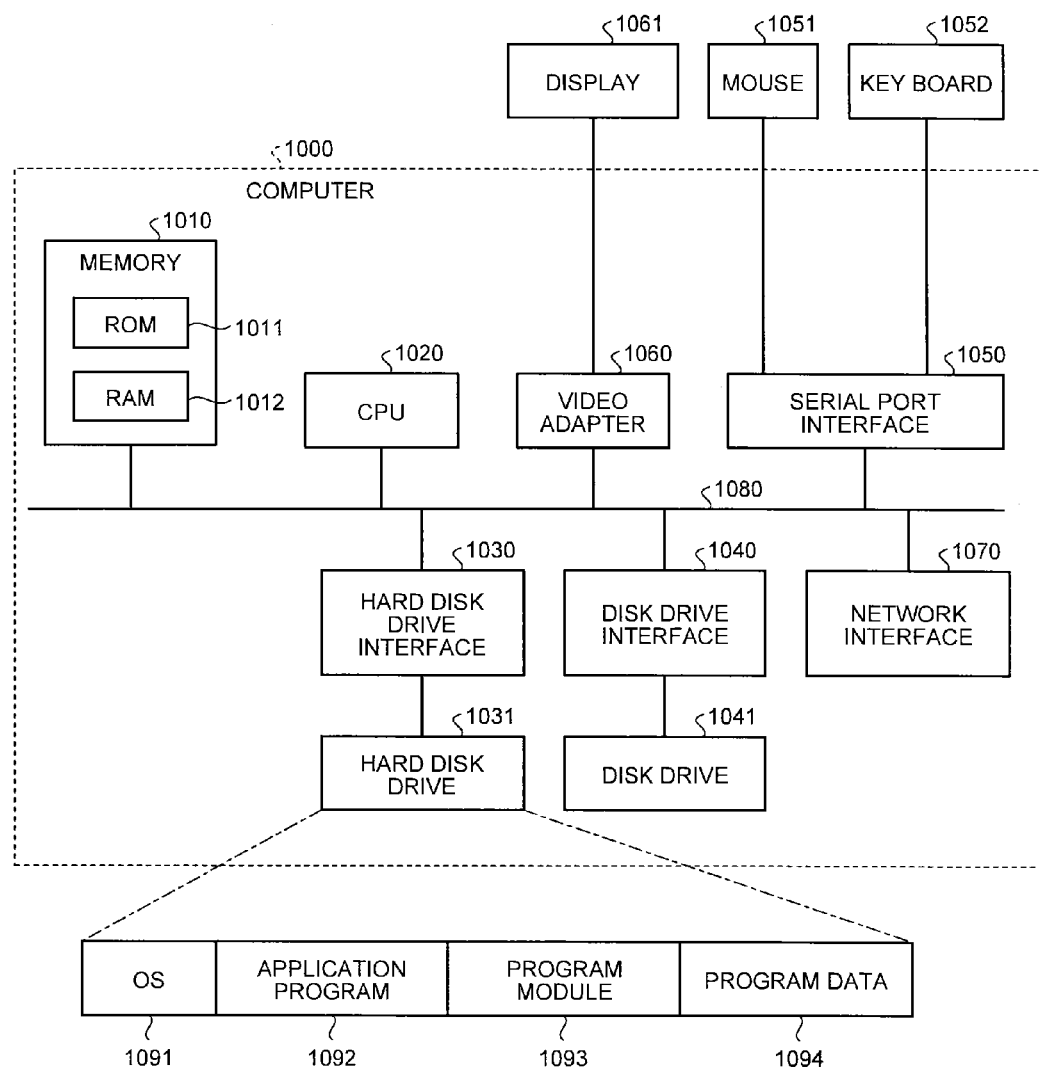
FIG. 9 is a diagram illustrating a computer that executes a monitoring program.

FIG. 9 is a diagram illustrating a computer 1000 that executes a monitoring program. As exemplified in FIG. 9, the computer 1000 has, for example, a memory 1010, a CPU 1020, a hard disk drive interface 1030, a disk drive interface 1040, a serial port interface 1050, a video adapter 1060, and a network interface 1070, and these units are connected by a bus 1080.

The memory 1010 includes, as exemplified in FIG. 9, a read only memory (ROM) 1011 and a RAM 1012. The ROM 1011 stores therein a boot program, such as a basic input output system (BIOS), for example. The hard disk drive interface 1030 is, as exemplified in FIG. 9, connected to the hard disk drive 1031. The disk drive interface 1040 is, as exemplified in FIG. 9, connected to the disk drive 1041. An attachable and detachable storage medium, such as a magnetic disk or an optical disk, for example, is inserted into the disk drive. The serial port interface 1050 is, as exemplified in FIG. 9, connected to, for example, a mouse 1051 and a key board 1052. The video adapter 1060 is, as exemplified in FIG. 9, connected to, for example, a display 1061.

As exemplified in FIG. 9, the hard disk drive 1031 stores therein, for example, an OS 1091, an application program 1092, a program module 1093, and program data 1094. That is, the above described monitoring program is stored, as a program module in which commands executed by the computer 1000 are described, in the hard disk drive 1031, for example.

Further, the various data described in the above embodiment are stored, as the program data, in the memory 1010 or hard disk drive 1031, for example. The CPU 1020 reads, as necessary, the program module 1093 and program data 1094 stored in the memory 1010 or hard disk drive 1031 out to the RAM 1012, and executes an access monitoring sequence, an access control sequence, a process monitoring sequence, and a process control sequence.

The program module 1093 and program data 1094 related to the monitoring program are not necessarily stored in the hard disk drive 1031, and may be, for example, stored in an attachable and detachable storage medium and read out via the disk drive or the like by the CPU 1020. Or, the program module 1093 or program data 1094 related to the monitoring program may be stored in another computer connected via a network (local area network (LAN), wide area network (WAN), or the like) and read out via the network interface 1070 by the CPU 1020.

REFERENCE SIGNS LIST

10 Monitoring unit
11 Program executing unit
12 Determining unit
13 DLL monitoring unit
14 DLL loading control unit
15 Instruction adding unit
20 Monitoring target program
20a Monitoring non-target program
30 OS

The invention claimed is:

1. A monitoring device, comprising:
circuitry configured to:
determine whether or not a program to be executed is a program to be monitored;
when the circuitry determines the program as the program to be monitored, the circuitry is further configured to dynamically generate a first instruction string satisfying a condition of executing a condition branch instruction each time a dynamic link library (DLL) implemented with an application program interface (API) to be hooked is loaded into a memory, the API being called by the program to be monitored, wherein the condition branch instruction is an instruction starting a process for monitoring behavior of the program to be monitored;

add the first instruction string and the condition branch instruction in order, followed by an instruction string included in the API to be hooked;

disable the program's ability to recognize that the program being monitored; and monitor the program being executed without the monitoring being obstructed.

2. The monitoring device according to claim 1, wherein the circuity is further configured to randomly acquire one pair from a plurality of pairs, each of the plurality of pairs associating the condition branch instruction with the first instruction string, and add, before the instruction string called by the program to be monitored, the condition branch instruction and the first instruction string associated with each other in the acquired pair.

3. The monitoring device according to claim 1, wherein the circuitry is further configured to add, in order, the first instruction string executing an arithmetic operation or a comparison operation such that a value stored in a flag register satisfies the condition and the condition branch instruction that is the instruction starting the predetermined control process when the flag register satisfies the condition.

4. The monitoring device according to claim 1, wherein the circuitry is further configure to execute a function including the instruction string that has been added with the condition branch instruction d the first instruction string by the circuitry, and perform, as the predetermined control process, the process of monitoring behavior of the program to be monitored.

5. The monitoring device according to claim 3, wherein the circuitry is further configured to execute a function including the instruction string that has been added with the condition branch instruction and the first instruction string by the circuitry, and perform, as the predetermined control process, the process of monitoring behavior of the program to be monitored.

6. The monitoring device according to claim 2, wherein the circuitry is further configured to add, in order, the first instruction string executing an arithmetic operation or a comparison operation such that a value stored in a flag register satisfies the condition and the condition branch instruction that is the instruction starting the predetermined control process when the flag register satisfies the condition.

7. The monitoring device according to claim 2, wherein the circuitry is further configured to execute a function including the instruction string that has been added with the condition branch instruction and the first instruction string by the circuitry, and perform, as the predetermined control process, the process of monitoring behavior of the program to be monitored.

8. The monitoring device according to claim 6, wherein the circuitry is further configured to execute a function including the instruction string that has been added with the condition branch instruction and the first instruction string by the circuitry, and perform, as the predetermined control process, the process of monitoring behavior of the program to be monitored.

9. A monitoring method executed by a monitoring device, the monitoring method including:

determining, by circuitry, whether or not a program to be executed is a program to be monitored;

when the program to be executed is determined to be the program to be monitored, dynamically generating a first instruction string satisfying a condition of executing a condition branch instruction each time a dynamic link library (DLL) implemented with an application program interface (API) to be hooked is loaded into a memory, the API being called by the program to be monitored, wherein the condition branch instruction is an instruction starting a process For monitoring behavior of the program to be monitored;

adding, by the circuitry, the first instruction string and the condition branch instruction in order, followed by an instruction string included in the API to be hooked;

disable, by the circuitry, the program's ability to recognize that the program being monitored; and monitor, by the circuitry, the program being executed without the monitoring being obstructed.

* * * * *